(12) United States Patent
Liang

(10) Patent No.: US 11,831,493 B2
(45) Date of Patent: Nov. 28, 2023

(54) SIGNATURE RULE LOADING

(71) Applicant: New H3C Technologies Co., Ltd, Hangzhou (CN)

(72) Inventor: Liwen Liang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 250 days.

(21) Appl. No.: 16/060,185

(22) PCT Filed: Feb. 27, 2017

(86) PCT No.: PCT/CN2017/074974
§ 371 (c)(1),
(2) Date: Jun. 7, 2018

(87) PCT Pub. No.: WO2017/148346
PCT Pub. Date: Sep. 8, 2017

(65) Prior Publication Data
US 2018/0367377 A1   Dec. 20, 2018

(30) Foreign Application Priority Data

Mar. 2, 2016   (CN) .......................... 201610116549.6

(51) Int. Cl.
*H04L 9/00*      (2022.01)
*H04L 41/08*     (2022.01)
(Continued)

(52) U.S. Cl.
CPC .............. *H04L 41/08* (2013.01); *H04L 63/20* (2013.01); *H04L 67/10* (2013.01); *H04L 63/0263* (2013.01); *H04L 63/1416* (2013.01)

(58) Field of Classification Search
CPC ......... H04L 41/08; H04L 63/20; H04L 67/10; H04L 63/1416; H04L 63/0263
See application file for complete search history.

(56) References Cited

U.S. PATENT DOCUMENTS 8,199,754 B2   6/2012   Smith et al.
8,635,594 B1   1/2014   Krishnan et al.
(Continued)

FOREIGN PATENT DOCUMENTS

CN   102457415   5/2012
CN   102523102   6/2012
(Continued)

OTHER PUBLICATIONS

Office Action issued in Corresponding Japanese Patent Application No. 2018-545201, dated Jul. 11, 2019. (English Translation).
(Continued)

*Primary Examiner* — Abu S Sholeman
*Assistant Examiner* — Kevin Ayala
(74) *Attorney, Agent, or Firm* — NORTON ROSE FULBRIGHT US LLP

(57) ABSTRACT

Disclosed is a method of loading a signature rule and a network device thereof. According to an example of the method, the network device may first receive a signature rule library sent by a cloud server, wherein the signature rule library contains one or more signature rules, each of which is associated with corresponding device type configuration information. The network device may determine for each signature rule whether device type configuration information associated with the signature rule matches local device type configuration information of the network device. If the device type configuration information associated with the signature rule matches the local device type configuration information of the network device, the network device may load the signature rule.

8 Claims, 7 Drawing Sheets

(51) Int. Cl.
*H04L 9/40* (2022.01)
*H04L 67/10* (2022.01)

(56) References Cited

U.S. PATENT DOCUMENTS

| | | | | |
|---|---|---|---|---|
| 9,210,030 | B1* | 12/2015 | Miller | H04L 67/42 |
| 9,515,877 | B1* | 12/2016 | Tempel | H04L 41/046 |
| 9,665,535 | B1* | 5/2017 | Burgett | G06F 9/44505 |
| 2008/0005285 | A1* | 1/2008 | Robinson | H04L 41/0893 |
| | | | | 709/220 |
| 2010/0037317 | A1* | 2/2010 | Oh | G06F 21/554 |
| | | | | 726/23 |
| 2014/0025790 | A1* | 1/2014 | Robitaille | H04L 61/2015 |
| | | | | 709/220 |
| 2015/0074756 | A1* | 3/2015 | Deng | H04L 63/1441 |
| | | | | 726/1 |
| 2015/0237072 | A1* | 8/2015 | Nukala | G06F 21/6236 |
| | | | | 726/1 |
| 2015/0281276 | A1* | 10/2015 | U | H04L 63/20 |
| | | | | 726/1 |
| 2015/0304344 | A1* | 10/2015 | Shin | H04L 63/0227 |
| | | | | 726/1 |
| 2017/0063927 | A1* | 3/2017 | Schultz | H04L 63/20 |

FOREIGN PATENT DOCUMENTS

| | | |
|---|---|---|
| CN | 102694820 | 9/2012 |
| CN | 102752275 | 10/2012 |
| CN | 102932370 | 2/2013 |
| CN | 103248525 | 8/2013 |
| CN | 103607379 | 2/2014 |
| JP | 2013-544004 | 12/2013 |
| WO | WO 2016/000160 | 1/2016 |

OTHER PUBLICATIONS

International Search Report and Written Opinion issued in International Patent Application No. PCT/CN2017/074974, dated May 8, 2017.

Office Action issued in corresponding Chinese Application No. 201610116549.6, dated Sep. 27, 2019 (machine translation provided).

Extended European Search Report issued in Corresponding European Patent Application No. 17759197.1, dated Feb. 4, 2019.

* cited by examiner

SIGNATURE RULE LOADING

CROSS REFERENCE TO RELATED APPLICATIONS

This application is a national phase under 35 U.S.C. § 371 of International Application No. PCT/CN2017/074974, filed on Feb. 27, 2017, which claims the benefit of priority to Chinese Patent Application No. 201610116549.6, filed on Mar. 2, 2016, the entire contents of each of which 0 are incorporated herein by reference.

BACKGROUND

With the development of the security offensive and defensive technology, means of hacker attacks are increasing. In order to protect against more attacks, the scale of a signature library carried by a device is also growing. Among others, the signature library may contain a plurality of signature rules. In a signature rule issuing system, there is a largest-scale signature library containing all signature rules and various signature sub-libraries. The largest-scale signature library may be tailored according to the type (e.g., a router, switch, or wireless access controller (AC)) and the model (e.g., a high-end, middle-end, and low-end configuration, etc.) of a device to obtain the signature sub-libraries. In this way, a signature sub-library may contain a signature rule corresponding to the device and the signature sub-library may be stored in the cloud server.

In a virtual scenario, a signature rule issuing system may achieve issuing of a signature rule by issuing a signature sub-library through a Software Defined Network (SDN) controller. For example, when a signature rule is issued, the SDN controller may first sense the type and model of all the virtual devices within its administrated range, and then for the same type of virtual devices, may issue the signature sub-library to the type of virtual devices within the administrated range according to the lowest-end configuration criteria in the sensed models of the type of virtual devices.

DETAILED DESCRIPTION OF THE EMBODIMENTS

Figure 1:
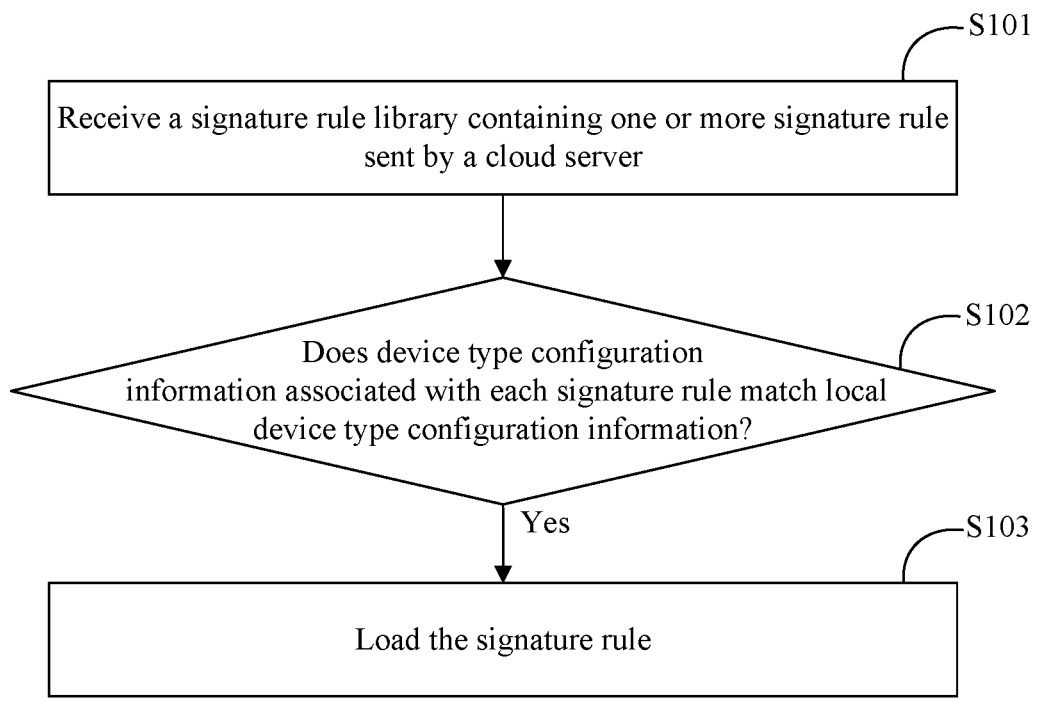
FIG. 1 illustrates a schematic flow diagram of a method of loading a signature rule according to an example of the present disclosure.

The technical solution of the embodiments of this disclosure will be described clearly and completely below in conjunction with the accompanying drawings in this disclosure, and it will be apparent that the described examples are merely a part of examples of this disclosure, rather than all examples. All other examples obtained by those skilled in the art based on the examples in this disclosure without making creative work are within the scope of protection of this disclosure.

According to the present disclosure, a signature rule loading method is provided that enables a network device to automatically select and load signature rules according to its own requirements to ensure that all of the signature rules loaded by the network device match local device type configuration information of the network device. In this way, the network device may not only effectively use its resources, but also give full play to its function.

A method of loading a signature rule according to an example of the present disclosure is first described below.

In a real scenario, the method of loading a signature rule may be applied for issuing signature rules for a network device. For example, the network device may select and load corresponding signature rules according to its own configuration requirements. Among others, the network device may be a switch, a router or a wireless AC and the like.

In a virtualized scenario, the method of loading a signature rule may be applied to a virtual device implemented in a network device. For example, the virtual device may be a virtual router, a virtual firewall, etc.

In addition, the method of loading a signature rule may be executed by a client, or may be executed by a plugin.

In the method of loading a signature rule, each of signature rules contained in the signature rule library stored in the cloud server may be marked with associated device type configuration information. And wherein, the device type configuration information may be the type and model (e.g., a high-end router, a low-end wireless AC, a middle-end switch, etc.) of a device. In another example, the device type configuration information may be configuration information of an object protected by a device (hereinafter, referred to as configuration information of protected object). The object may be a PC, a server, and so on. For example, the configuration information of the object may be the type of an operation system of the protected object (e.g., Windows, Linux, Mac OS, etc.). In this way, the network device may, according to the device type configuration information, automatically select signature rules corresponding to itself from the signature rule library sent from a cloud server. The above method may effectively save the storage space of the cloud server and may reduce the space management complexity of the cloud server, compared with the technical solution in which various signature sub-libraries tailored for the network devices of different device type configurations are stored in the cloud server and the signature rules are issued in the form of issuing a signature sub-library.

As shown in FIG. 1, the method of loading a signature rule may include the following block S101 to block S103.

At block S101: a network device may receive a signature rule library sent by a cloud server, wherein the signature rule library contains one or more signature rules, each of which is associated with corresponding device type configuration information.

Before receiving the signature rule library sent by the cloud server, the network device may actively send upgrade request information to the cloud server so as to request for an upgrade processing of signature rules. Alternatively, in a virtualized scenario, the cloud server may actively issue a signature rule library to the network device as a virtual device so that the network device may perform the loading and configuring of the signature rules in time, or upgrade and improve the signature rules that have been already loaded by the network device.

Moreover, in view of the fact that various network devices with different types and configurations may have different loading configuration capabilities for signature rules. In an example, a signature rule library sent by a cloud server may contain one or more signature rules, each of which is associated with corresponding device type configuration information. In this way, the network device receiving the signature rule library may automatically select and load the signature rules according to the device type configuration information.

At block S102: the network device may determine for each signature rule whether device type configuration information associated with the signature rule matches local device type configuration information of the network device. If the device type configuration information associated with the signature rule matches the local device type configuration information of the network device, proceed to block S103, otherwise, the signature rule may be discarded.

Since the network device will receive a signature rule library sent by a cloud server, for each signature rule contained in the signature rule library, the network device may parse out the device type configuration information associated with the signature rule, and determine whether the device type configuration information associated with the signature rule matches the local device type configuration information of the network device. The network device may continue loading process of the signature rule when it is determined that the device type configuration information associated with the signature rule matches the local device type configuration information of the network device. Any technique known to those skilled in the art may be used to parse out device type configuration information associated with a signature rule, which will not be described herein.

In a virtual scenario, the virtual device may also determine for each signature rule whether the device type configuration information associated with the signature rule matches the local device type configuration information. Moreover, the virtual device may continue loading process of the signature rule when it is determined that the device type configuration information associated with the signature rule matches the local device type configuration information of the virtual device.

At block S103: the network device may load a signature rule associated with the device type configuration information that matches the local device type configuration information of the network device.

After determining a signature rule matching the local device type configuration information, the network device may perform the loading operation for the signature rule. Moreover, after the network device completes the loading of the signature rule, the function corresponding to the signature rule may work. Among others, any technique known to those skilled in the art may be used to load a signature rule, which will not be described here. Of course, for the cloud server, the issuing of the signature rule has taken into effect.

In an example, in a signature rule issuing system, the action executed by a cloud server is to issue the signature rule library; and the action executed by a network device is to select and load the matching signature rules in the signature rule library.

When this example is applied, a network device may first receive a signature rule library sent by a cloud server, wherein the signature rule library contains one or more signature rules, each of which is associated with corresponding device type configuration information. Then, the network device may determine for each signature rule whether the device type configuration information associated with the signature rule matches the local device type configuration information of the network device; and the network device may load the signature rule if the device type configuration information associated with the signature rule matches the device type configuration information of the network device. Unlike the cloud server issuing various signature sub-libraries that have been tailored to contain a part of signature rules, the cloud server in this example may store and send a largest signature rule library that contains all the signature rules, thus effectively saving the storage space of the cloud server. In addition, since each signature rule contained in the signature rule library associates with device type configuration information respectively, the network device may be enabled to automatically select and load signature rules in the signature rule library according to its own requirements (for example, the device type configuration information) to ensure that the signature rules loaded by the network device match local device type configuration information of the network device, thus effectively using the network device resources and giving full play to the function of the network device.

In an example, in a virtual scenario, the cloud server may actively issue a signature rule library to a virtual device within its administrated range so that the virtual device may load the signature rules contained in the signature rule library. For example, in the virtual scenario, receiving a signature rule library sent by a cloud server (S101) may include receiving the signature rule library sent by the cloud server through SDN controller.

In this example, the SDN controller may not need to know corresponding relationship between signature rules contained in the issued signature rule library and a virtual device, while the virtual device may automatically select and download required signature rules according to the device type configuration information associated with each signature rule contained in the signature rule library. By applying a method of loading a signature rule provided in this example, the SDN controller does not determine a type and model of the virtual device, thus reducing the load pressure of the SDN controller and improving the efficiency that the virtual device loads the signature rule. Of course, it is to be understood that a cloud server may send a signature rule library through a SDN controller regularly or irregularly. For example, when the cloud server detects that a locally stored signature rule has changed, the cloud server may actively issue a signature rule library to virtual device within its administrated range.

Figure 2:
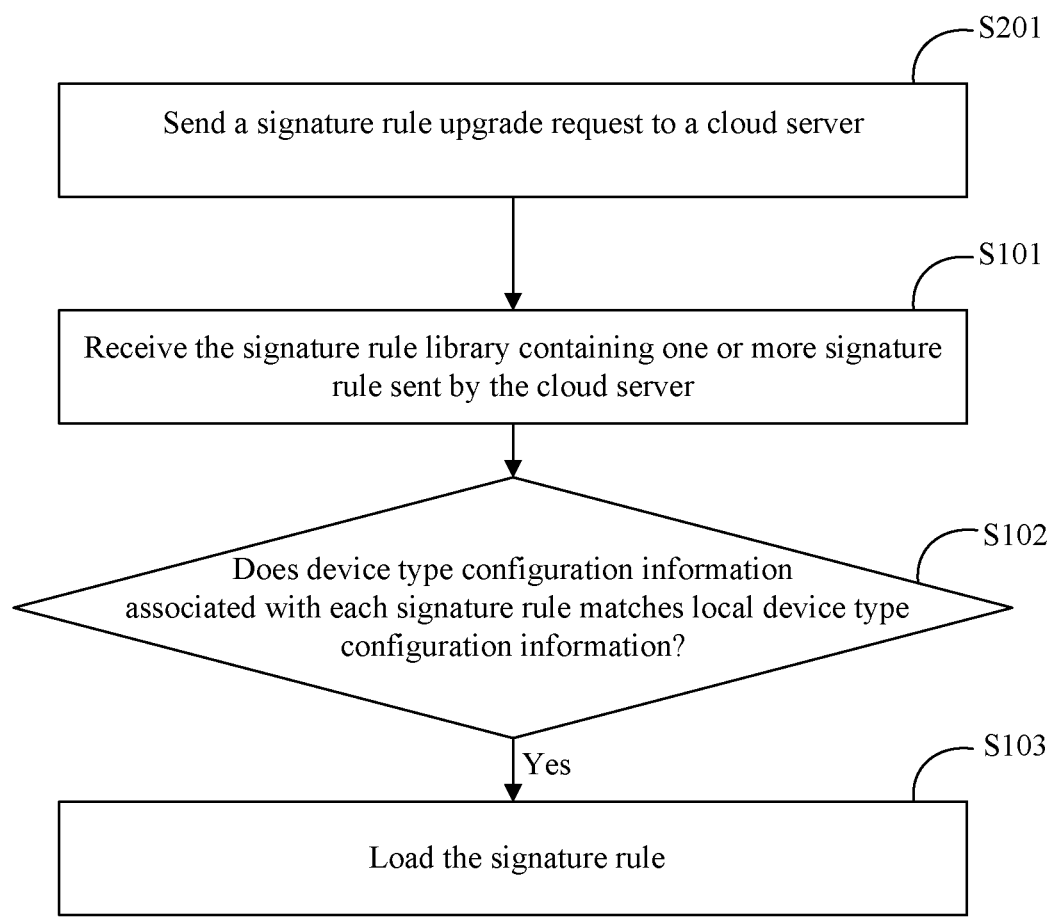
FIG. 2 illustrates a schematic flow diagram of a method of loading a signature rule method according to another example of the present disclosure.

In addition, a network device may actively request a signature rule from a cloud server. For example, as shown in FIG. 2, before a signature rule library sent by the cloud server is received (S101), the method of loading a signature rule provided in this example may further include block S201: the network device may send an upgrade request for the signature rule library to the cloud server.

For example, when the resources of a network device are sufficient, but the loaded signature rules cannot meet the functions it may take, the network device may actively request for a signature rule from the cloud server to obtain and load the corresponding signature rule so as to achieve the upgrade of the signature rules. Alternatively, when a signature rule has never been loaded and the signature rule needs to be loaded and configured, a network device may also actively request for a signature rule from the cloud server to obtain and load the corresponding signature rule.

Further, in connection with block S101 to block S103 and block S201, a cloud server may issue a signature rule library to a network device after the network device actively requests for the signature rule from the cloud server. In this way, after receiving the signature rule library, the network device may automatically select and load the signature rules required by the network device according to the device type configuration information associated with each signature rule in the signature rule library.

In this way, since users may not need to select a signature sub-library meeting the needs of a network device from many types of signature sub-libraries, it may effectively avoid selecting a wrong signature sub-library to be loaded due to being unclear about the type of signature sub-libraries in a cloud server. For example, a network device with a low-end configuration may load a signature sub-library corresponding to high-end configuration due to the wrong selection of users, so that the network device with the low-end configuration may run out of resources due to loading too many signature rules. Alternatively, a network device with a high-end configuration may load a signature sub-library corresponding to low-end configuration due to the wrong selection of users, so that the function of the network device with the high-end configuration is restricted. In addition, in an example, the signature rules are selected completely automatically without the participation of users, which may save time and effort of users.

Further, the device type configuration information associated with each signature rule may be recorded in a format of Type-Length-Value (TLV), wherein the TLV may be added to the signature rule. For example, each signature rule stored in a signature rule library may record the specific content of the each signature rule in the format of TLV, wherein TLV is a variable format, which means: Type, Length, and Value. The length of Type and the length of Length may be fixed, for example, 2 or 4 bytes. The length of Value may be specified based on the Length. In order to ensure the consistency of the contents contained in a signature rule library, the format of device type configuration information associated with each signature rule may be recorded in the format of TLV. In this way, it may be achieved as long as resolving process of the device type configuration information recorded in the format of TLV are added on a network device In an example, a Type field is used to identify the TLV in which the Type field is located to indicate device type configuration information. For example, the Type field may be specifically set as "device", and the specific content of the device type configuration information may be recorded in a Value field.

For example, when device type configuration information is the type and model of a device, the specific value of a Value may be set as Table 1.

TABLE 1

| | Device type and model | | | | | | | |
|---|---|---|---|---|---|---|---|---|
| | Security device-high-end | Security device-middle-end | Security device-low-end | Router-high-end | Router-low-end | Wireless-high-end | Wireless-low-end | Others |
| Value | a | b | c | d | e | f | g | Extensible |

For example, if a signature rule library contains a signature rule 100001, and the value of device type configuration information associated with the signature rule 100001 is "ad", which means that the signature rule 100001 may be issued to a security device with a high-end configuration and a router with a high-end configuration. In this way, after a security device with a high-end configuration receives the signature rule 100001 associated with the device type configuration information of which the value is "ad", since device type configuration information "ad" contains "a" corresponding to the security device with the high-end configuration, the security device with the high-end configuration may determine that the device type configuration information associated with the signature rule 100001 may match a local device type configuration information of the security device with the high-end configuration, and the security device with the high-end configuration may load the signature rule 100001.

Similarly, a router with a high-end configuration may also determine the device type configuration information match local device type configuration information "d" according to the device type configuration information "ad" associated with the signature rule 100001, then the signature rule 100001 may continue to be loaded.

Other devices except a security device with a high-end configuration and a router with a high-end configuration may discard the signature rule 100001 after receiving the signature rule 100001, so that the signature rule 100001 may not be loaded.

As another example, when device type configuration information is configuration information of an object protected by a device, the specific value of the Value may be set as Table 2.

TABLE 2

| | Configuration information of a protected object | | | | | | |
|---|---|---|---|---|---|---|---|
| | Windows | Linux | Unix | Solaris | Mac OS | Novel | Others |
| Value | A | B | C | D | E | F | Extensible |

For example, if a signature rule library contains the signature rule 100002, and the value of device type configuration information associated with the signature rule 100002 is "AB", which means that the signature rule 100002 may be issued to the devices whose protected object has a system type of Windows or Linux. In this way, after the device whose protected object has a system type of Windows or Linux receives the signature rule 100002 associated with the device type configuration information of which the value is "AB", since the device type configuration information "AB" contains "A" corresponding to Windows or "B" corresponding to Linux, the devices whose protected object has a system type of Windows or Linux may determine that the device type configuration information associated with the signature rule 100002 matches a local device type configuration information of the device, and the device may load the signature rule 100002.

Other devices except the device whose protected object has a system type of Windows and the device whose protected object has a system type of Linux may discard the signature rule 100002 after receiving the signature rule 100002, so that the signature rule 100002 may not be loaded.

Of course, other character identifiers may also be used to set the value of Value corresponding to device type configuration information, as long as it is ensured that device type configuration information associated with each signature rule contained in a signature rule library issued by a cloud server is able to match the character identifiers of local device type configuration information of a network device that needs to load the signature rule.

Figure 3:
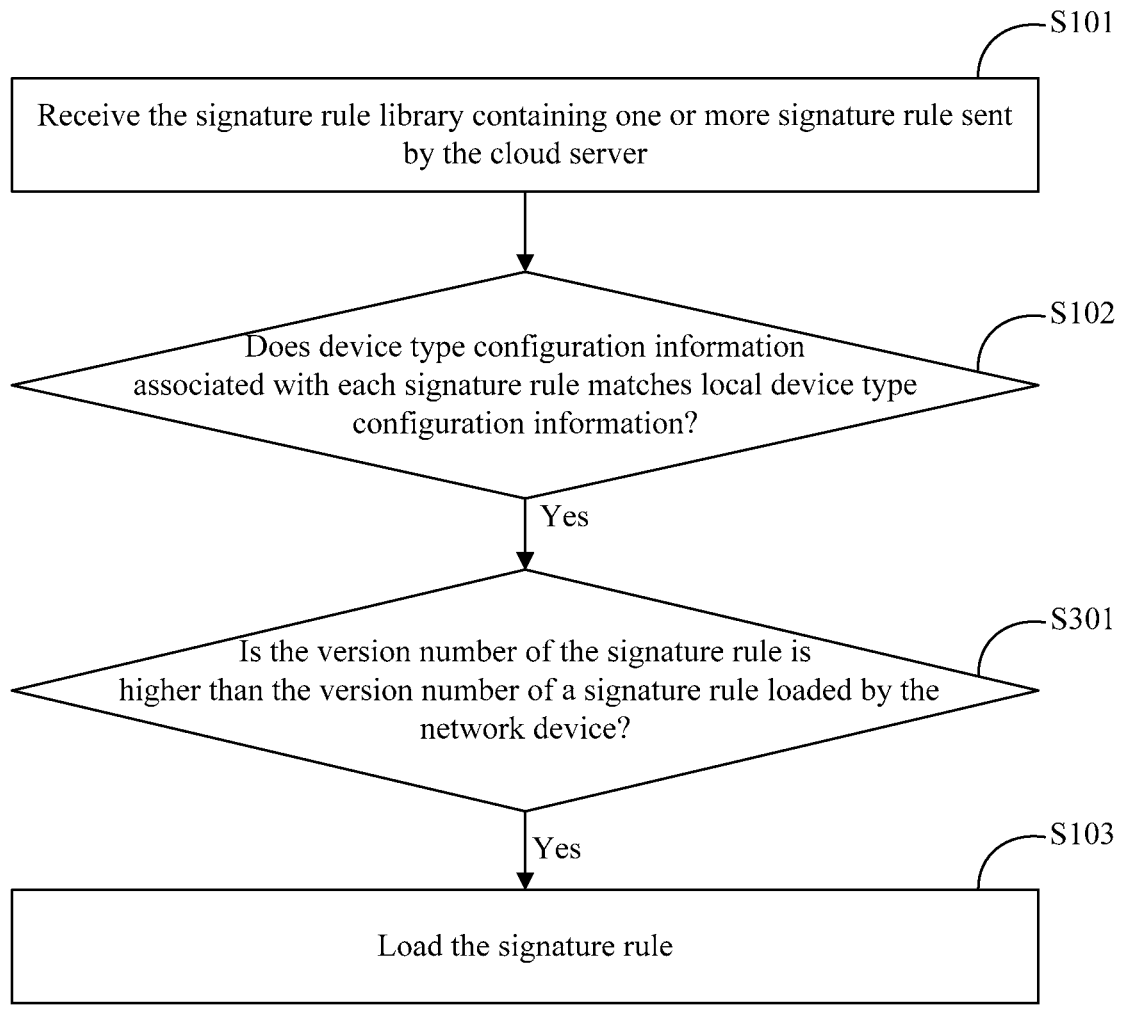
FIG. 3 illustrates a schematic flow diagram of a method of loading a signature rule according to still another example of the present disclosure.

Of course, signature rules in a signature rule library stored by a cloud server are often continually improved and upgraded. Therefore, in order to facilitate management of signature rules, each signature rule may carry a version number so that a network device may determine whether to upgrade a signature rule according to the version number of the signature rule. For example, as shown in FIG. 3, before the signature rule is loaded (S103), the method of loading a signature rule in this example may further include block S301: the network device may determine whether the version number of the signature rule to be loaded is higher than the version number of a signature rule loaded by the network device. Moreover, the network device may proceed to block S103 if the version number of the signature rule to be loaded is higher than the version number of the signature rule loaded by the network device.

When a network device determines that the device type configuration information associated with a signature rule to be loaded matches the local device type configuration information of the network device, the network device may also determine whether the version number of the signature rule to be loaded is higher than the version number of a signature rule loaded by the network device. Moreover, when the version number of the signature rule to be loaded is higher than the version number of the signature rule loaded by the network device, the network device may determine that the network device needs to upgrade the signature rule, and the network device may continue the loading process of the signature rule.

Figure 4:
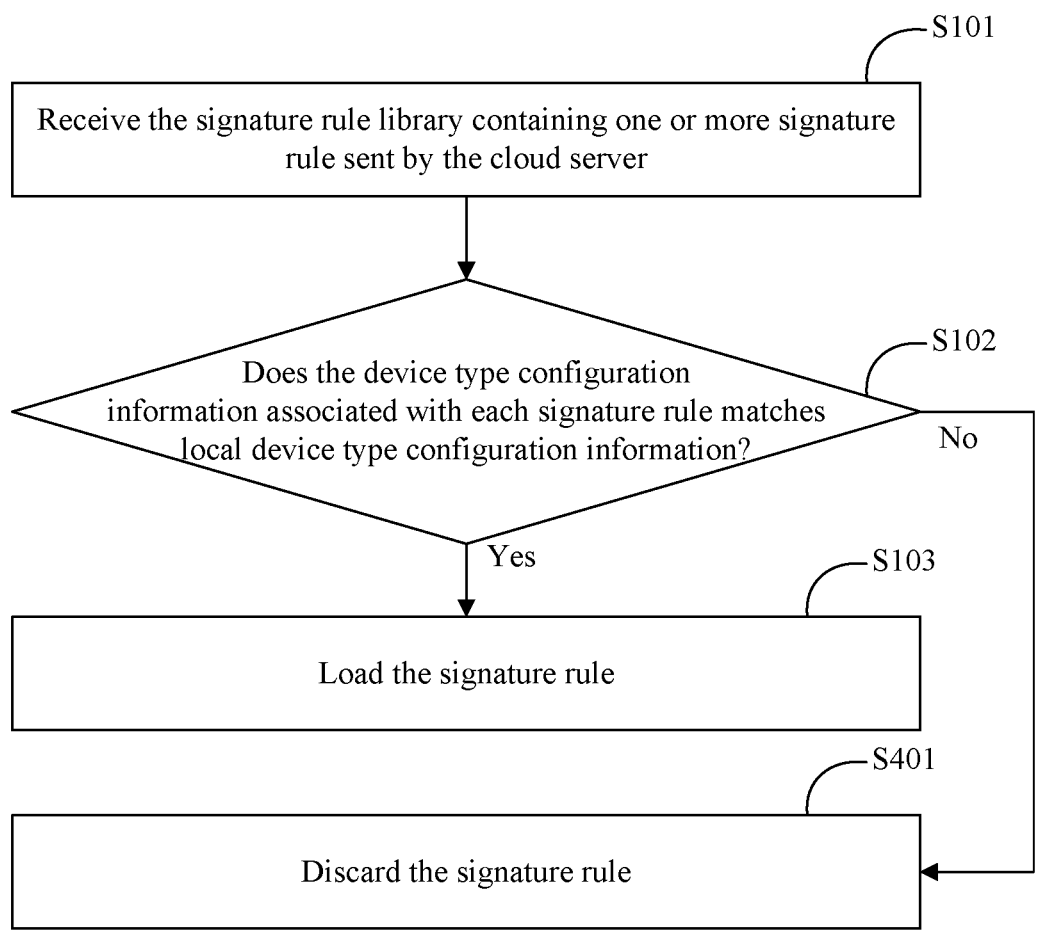
FIG. 4 illustrates a schematic flow diagram of a method of loading a signature rule according to still another example of the present disclosure.

The signature rule library issued by a cloud server may be a largest-scale signature rule library that contains all the signature rules that are already stored in the cloud server, and a network device may receive the issued signature rule library completely. In this way, it is to be understood that when a network device automatically selects and loads a signature rule matching the local device type configuration information according to the device type configuration information associated with each signature rule, the network device may also discard the signature rule that does not match the local device type configuration information. For example, as shown in FIG. 4, the method of loading a signature rule in this example may further include block S401: when the device type configuration information associated with the signature rule does not match the local device type configuration information of the network device, the network device may discard the signature rule, wherein any technique known to those skilled in the art may be used to discard the signature rule, which will not be described herein.

Figure 5:
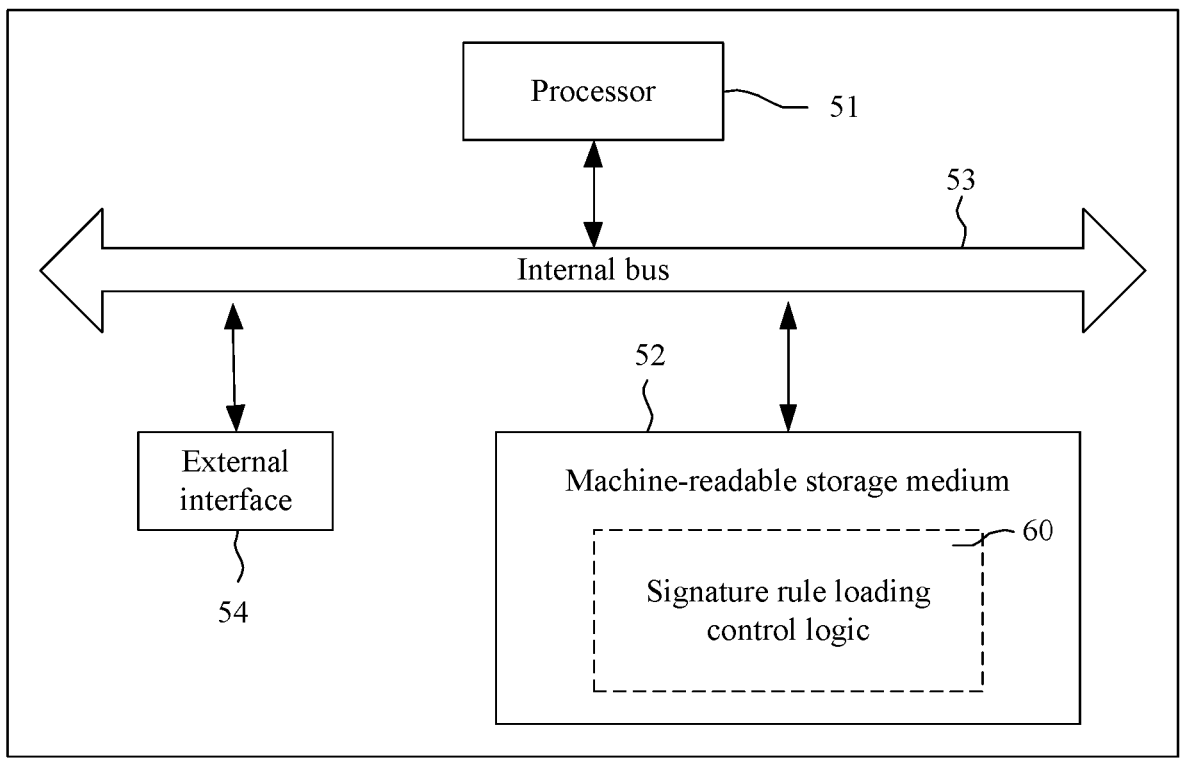
FIG. 5 illustrates a schematic diagram of a hardware structure of a network device according to an example of the present disclosure.

Corresponding to the above method example, the present disclosure also provides a network device. As shown in FIG. 5, the network device may include a processor 51 and a machine-readable storage medium 52, wherein the processor 51 and the machine-readable storage medium 52 may be connected with each other via an internal bus 53. In other possible implementations, the network device may also include an external interface 54 capable of communicating with other devices or components.

In a different example, the machine-readable storage medium 52 may be a Random Access Memory (RAM), a volatile memory, a non-volatile memory, a flash drive, a storage drive (such as a hard disk drive), a solid state hard disk, any type of memory disks (such as an optical disk, a DVD, etc.), or similar storage medium, or a combination thereof.

Figure 6:
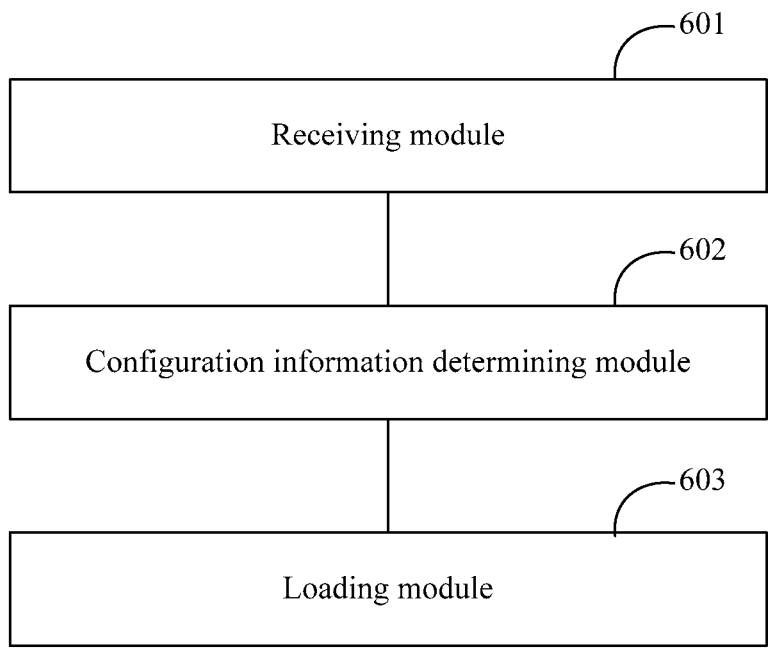
FIG. 6 illustrates a block diagram of functional modules of a signature rule loading control logic provided in accordance with an example of the present disclosure.

Further, the machine-readable storage medium 52 may store machine-readable instructions corresponding to the signature rule loading control logic 60 executed by the processor 51. As shown in FIG. 6, functionally divided, the control logic 60 may include a receiving module 601, a configuration information determining module 602, and a loading module 603.

The receiving module 601 is configured to receive a signature rule library sent by a cloud server, wherein the signature rule library contains one or more signature rules, each of which is associated with corresponding device type configuration information. According to one example, the device type configuration information associated with each signature rule may be recorded in the format of TLV.

The configuration information determining module 602 is configured to determine for each signature rule whether the device type configuration information associated with the signature rule matches local device type configuration information of a network device, and trigger the loading module 603 when the device type configuration information associated with the signature rule matches the local device type configuration information of the network device.

The loading module 603 is configured to load the signature rule to the network device.

When this example is applied, the network device may first receive a signature rule library sent by a cloud server, wherein the signature rule library contains one or more signature rules, each of which is associated with corresponding device type configuration information. Then, the network device may determine for each signature rule whether the device type configuration information associated with the signature rule matches local device type configuration information of the network device; and load the signature rule to the network device when the device type configuration information associated with the signature rule matches the local device type configuration information of the network device. Unlike a cloud server issuing various signature sub-libraries that have been tailored to contain a part of signature rules, the cloud server in this example may store and send the largest signature rule library that contains all the signature rules, thus effectively saving the storage space of the cloud server. In addition, since each signature rule contained in the signature rule library may be associated with device type configuration information respectively, the network device may be enabled to automatically select and load the signature rules in the signature rule library according to its own requirements (for example, the device type configuration information) to ensure that the signature rules loaded by the network device match the device type configuration information of the network device, thus effectively using the network device resources and giving full play to the function of the network device.

According to one example, the receiving module 601 may be configured to: receive a signature rule library sent by a cloud server through a SDN controller.

Figure 7:
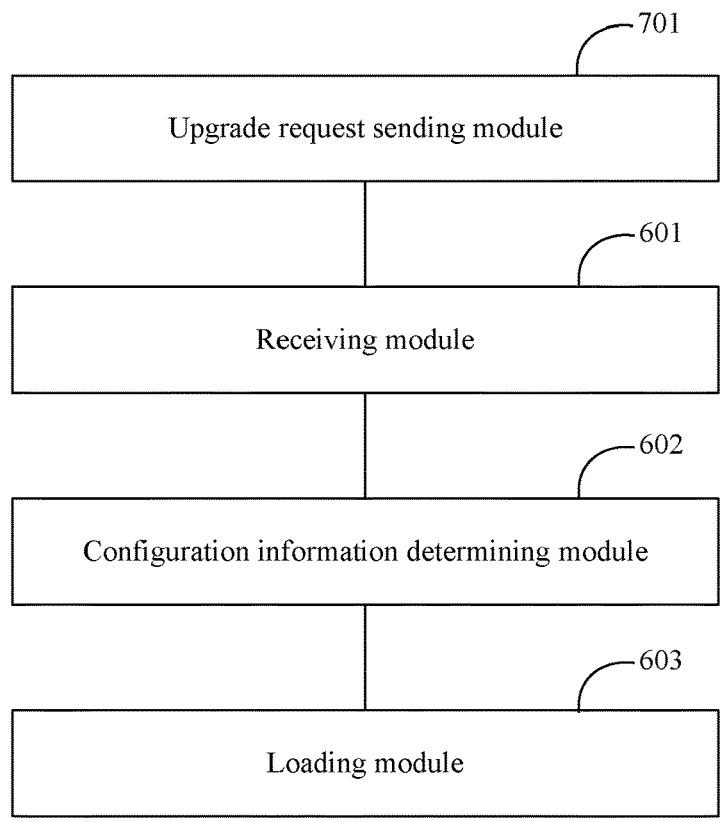
FIG. 7 illustrates a block diagram of functional modules of a signature rule loading control logic provided in accordance with another example of the present disclosure.

According to another example, as shown in FIG. 7, the signature rule loading control logic may also include an upgrade request sending module 701. The upgrade request sending module 701 may be configured to send an upgrade request for a signature rule library to the cloud server.

Figure 8:
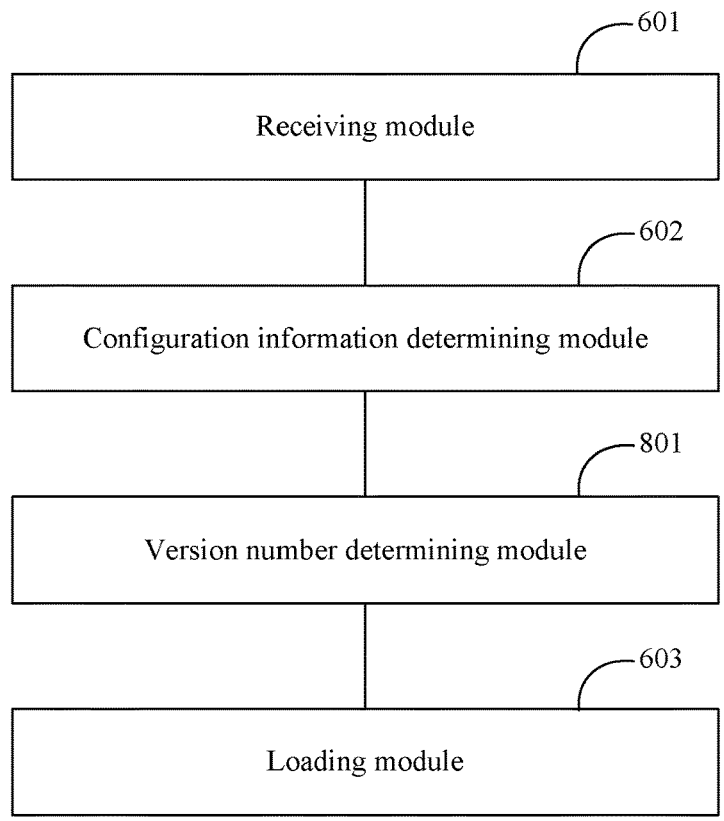
FIG. 8 illustrates a block diagram of functional modules of a signature rule loading control logic provided in accordance with still another example of the present disclosure.

According to another example, as shown in FIG. 8, the signature rule loading control logic may also include a version number determining module 801. The version number determination module 801 may be configured to determine whether a version number of the signature rule is higher than the version number of a signature rule loaded by the network device, and trigger the loading module 603 when the version number of the signature rule is higher than the version number of the signature rule loaded by the network device.

Figure 9:
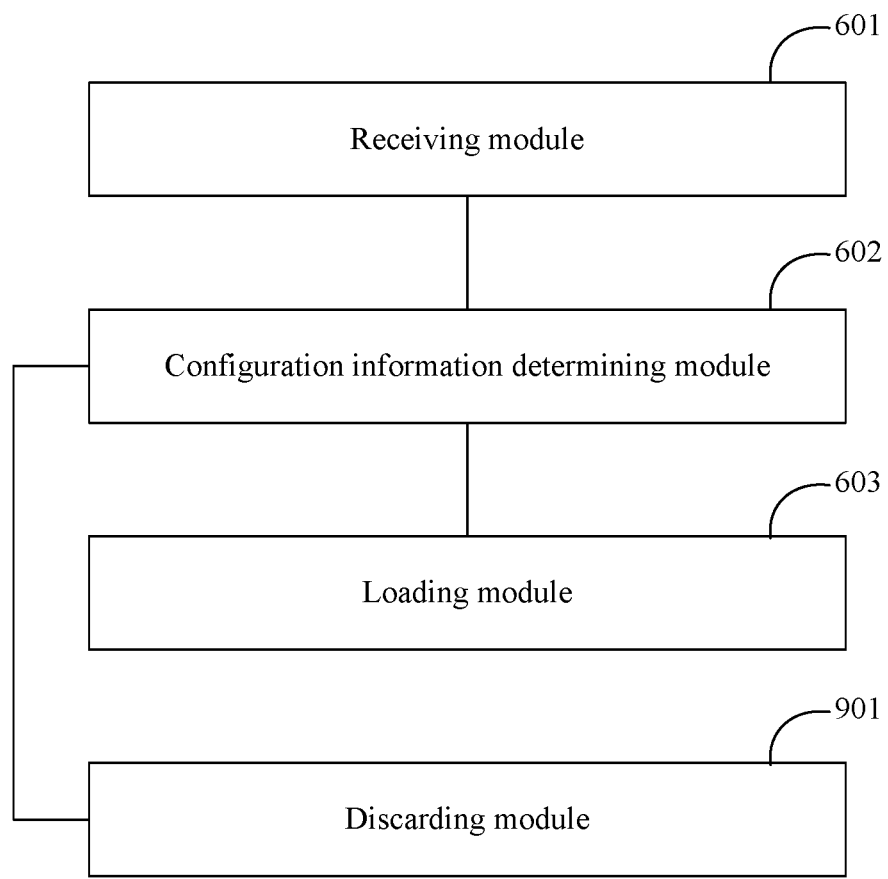
FIG. 9 illustrates a block diagram of functional modules of a signature rule loading control logic provided in accordance with still another example of the present disclosure.

According to another example, as shown in FIG. 9, the signature rule loading control logic may also include a discarding module 901. The discarding module 901 may be configured to discard the signature rule when the configuration information determining module 602 determines that the device type configuration information associated with the signature rule does not match local device type configuration information of the network device.

Taking a software implementation as an example below, it further describes how a network device executes the control logic 60. In an example, the control logic 60 of the present disclosure is to be understood as machine-executable instructions stored in the machine-readable storage medium 52. When the processor 51 on a network device of the present disclosure invokes and executes the machine-executable instructions corresponding to the control logic 60 stored on the machine-readable storage medium 52, the processor 51 may be caused to:

receive a signature rule library sent by a cloud server, wherein the signature rule library contains one or more signature rules, each of which is associated with corresponding device type configuration information, wherein the device type configuration information associated with the signature rule may be recorded in a format of TLV;

determine for each signature rule whether the device type configuration information associated with the signature rule matches local device type configuration information of the network device; and load the signature rule associated with the device type configuration information that matches the local device type configuration information of the network device to the network device.

According to an example, when receiving the signature rule library sent by the cloud server, the machine-executable instructions may further cause the processor 51 to: receive the signature rule library sent by the cloud server through a SDN controller.

According to an example, the machine-executable instructions may further cause the processor 51 to: send a signature rule upgrade request to the cloud server so that the cloud server may send the signature rule library.

According to an example, when loading the signature rule associated with the device type configuration information that matches the local device type configuration information of the network device to the network device, the machine-executable instructions may cause the processor 51 to: determine whether a version number of the signature rule is higher than the version number of a signature rule loaded by the network device, and load the signature rule to the network device if the version number of the signature rule is higher than the version number of the signature rule loaded by the network device.

According to an example, the machine-executable instructions may further cause the processor 51 to: discard the signature rule associated with the device type configuration information that does not match the local device type configuration information of the network device.

For the device example, since it corresponds substantially to the method example, the relevant parts are described with reference to the part of the method example. The device example described above is merely illustrative, wherein the unit described as the separate component may or may not be physically separate, and the component shown as a unit may or may not be a physical unit, i.e., may be located in one place or may be distributed to a plurality of network units. A part or all of the modules may be selected according to the actual needs to achieve the purpose of the solution of the present example. Those skilled in the art will understand and practice it without making creative work.

It is to be noted that, in this context, relational terms such as "first" and "second" are used only to distinguish an entity or operation from another entity or operation without necessarily requiring or implying that there is any such actual relationship or sequence between these entities or operations. The term such as "comprising", "including" or any other variants thereof is intended to encompass a non-exclusive inclusion such that the process, method, article or device comprising a series of elements includes not only those elements but also other elements that are not explicit listed or elements that are inherent to such process, method, article, or device. In the absence of more restrictions, the elements defined by the sentence "include . . . " or "comprising . . . " do not preclude the presence of additional same elements in the process, method, article, or device that includes the elements.

It will be understood by those skilled in the art that all or a part of the steps in the method examples described above may be implemented by instructing the associated hardware through a program, which may be stored in a machine-readable storage medium. The storage medium referred to herein may comprise, for example, a ROM/RAM, a disk, a CD and the like.

The foregoing disclosure is to merely illustrate the preferred examples of the present disclosure but are not intended to limit the claimed scope of the present disclosure, and any modifications, equivalent substitutions, adaptations, thereof made without departing from the spirit and principle of the present disclosure shall be encompassed in the scope of protection of the present disclosure.

The invention claimed is:

1. A method of loading a signature rule, comprising:
sending, by a network device, an upgrade request for a signature rule library to a cloud server, in a case that the network device is not correctly loaded the signature rule corresponding to a configuration of resources of the network device and thereby the network device does not meet requirements of functions that are undertaken by the network device;

receiving, by the network device, a signature rule library sent by the cloud server, wherein the signature rule library contains one or more signature rules, each of which is associated with corresponding device type configuration information, the device type configuration information includes device type and device model, wherein the device type refers to a router, switch, or wireless access controller, and the device model refers to a high-end, middle-end, or low-end configuration;

for each of the signature rules, parsing out, by the network device, device type configuration information associated with the signature rule and determining, by the network device, whether device type configuration information associated with the signature rule matches local device type configuration information of the network device to complete by the network device automatic selection of signature rules corresponding to the network device;

loading, by the network device, the signature rule associated with the device type configuration information that matches the local device type configuration information of the network device; and discarding, by the network device, the signature rule associated with the device type configuration information that does not match the local device type configuration information of the network device.

2. The method according to claim 1, wherein receiving the signature rule library sent by the cloud server comprises:

receiving, by the network device, the signature rule library sent by the cloud server through a Software Defined Network (SDN) controller.

3. The method according to claim 1, wherein the device type configuration information is recorded in a format of Type-Length-Value (TLV).

4. The method according to claim 1, wherein loading the signature rule comprises:

determining, by the network device, whether a version number of the signature rule is higher than that of a signature rule loaded by the network device, and loading, by the network device, the signature rule when the version number of the signature rule is higher than that of the signature rule loaded by the network device.

5. A network device, comprising:

a processor, wherein, by invoking and executing machine-executable instructions corresponding to a signature rule loading control logic stored on a non-transitory machine-readable storage medium, the processor is caused to:

send an upgrade request for a signature rule library to a cloud server, in a case that the network device is not correctly loaded the signature rule corresponding to a configuration of resources of the network device and thereby the network device does not meet requirements of functions that are undertaken by the network device;

receive a signature rule library sent by the cloud server, wherein the signature rule library contains one or more signature rules, each of which is associated with corresponding device type configuration information, the device type configuration information includes device type and device model, wherein the device type refers to a router, switch, or wireless access controller, and the device model refers to a high-end, middle-end, or low-end configuration;

for each of the signature rules, parsing out device type configuration information associated with the signature rule and determine whether device type configuration information associated with the signature rule matches local device type configuration information of the network device to complete automatic selection of signature rules corresponding to the network device;

load the signature rule associated with the device type configuration information that matches the local device type configuration information of the network device to the network device; and discard the signature rule associated with the device type configuration information that does not match the local device type configuration information of the network device.

6. The device according to claim 5, wherein when receiving the signature rule library sent by the cloud server, the machine-executable instructions further cause the processor to:

receive the signature rule library sent by the cloud server through a Software Defined Network (SDN) controller.

7. The device according to claim 5, wherein the device type configuration information is recorded in a format of Type-Length-Value (TLV).

8. The device according to claim 5, wherein when loading the signature rule to the network device, the machine-executable instructions further cause the processor to:

determine whether a version number of the signature rule is higher than that of a signature rule loaded by the network device, and load the signature rule to the network device when the version number of the signature rule is higher than that of the signature rule loaded by the network device.

* * * * *